United States Patent
Hong et al.

(10) Patent No.: US 6,292,508 B1
(45) Date of Patent: Sep. 18, 2001

(54) METHOD AND APPARATUS FOR MANAGING POWER IN A FREQUENCY HOPPING MEDIUM ACCESS CONTROL PROTOCOL

(75) Inventors: Hilton K. Hong, Fremont; Juan Grau, Jr., Redwood City; Arthur B. Coleman, Fremont, all of CA (US)

(73) Assignee: Proxim, Inc., Sunnyvale, CA (US)

( * ) Notice: Subject to any disclaimer, the term of this patent is extended or adjusted under 35 U.S.C. 154(b) by 0 days.

(21) Appl. No.: 08/717,762

(22) Filed: Sep. 23, 1996

Related U.S. Application Data

(63) Continuation-in-part of application No. 08/417,907, filed on Apr. 6, 1995, which is a continuation of application No. 08/205,155, filed on Mar. 3, 1994, now abandoned.

(51) Int. Cl.[7] .................................................. H04L 27/30
(52) U.S. Cl. .......................... 375/134; 375/356; 455/574
(58) Field of Search .................................... 375/202, 354, 375/357.2, 134, 133, 132; 455/343, 502, 503, 572, 573, 574; 327/544, 141, 142, 143, 144, 145, 522; 370/35, 324, 515, 520, 349, 428, 436, 254, 255, 431, 437; 364/187; 340/825.44, 825.45, 825.46, 825.47, 825.48; 371/32, 33, 34, 35; 380/33, 34, 48; 395/20.12, 684, 750, 838, 866, 200.78, 200.4, 200.52

(56) References Cited

U.S. PATENT DOCUMENTS

| | | | |
|---|---|---|---|
| 4,049,914 | 9/1977 | Anderson et al. | 179/2.5 R |
| 4,124,776 | 11/1978 | Nocker | 179/15 AL |
| 4,411,007 | 10/1983 | Rodman et al. | 375/107 |
| 4,554,668 | 11/1985 | Deman et al. | 375/1 |
| 4,558,453 | 12/1985 | Mimken | 375/1 |
| 4,606,040 | * 8/1986 | David et al. | 375/1 |
| 4,626,843 | 12/1986 | Szeto et al. | 340/825.5 |
| 4,627,051 | 12/1986 | Shimizu | 370/86 |
| 4,661,902 | 4/1987 | Hocksprung et al. | 364/200 |
| 4,677,617 | 6/1987 | O'Connor et al. | 370/100 |
| 4,697,263 | 9/1987 | Beaufoy | 370/85 |
| 4,709,347 | 11/1987 | Kirk | 364/900 |
| 4,736,393 | 4/1988 | Grimes et al. | 375/107 |
| 4,837,850 | 6/1989 | Maisel et al. | 455/58 |
| 4,850,036 | 7/1989 | Smith | 455/179 |
| 4,984,247 | 1/1991 | Kaufmann et al. | 375/1 |
| 5,003,470 | 3/1991 | Carpenter et al. | 364/200 |
| 5,010,330 | 4/1991 | Snowden et al. | 340/825.21 |
| 5,068,877 | 11/1991 | Near et al. | 375/107 |
| 5,089,813 | 2/1992 | DeLuca et al. | 340/825.44 |
| 5,121,408 | 6/1992 | Cai et al. | 375/1 |
| 5,230,084 | 7/1993 | Nguyen | 455/38.3 |
| 5,231,634 | 7/1993 | Giles et al. | 370/95.1 |
| 5,241,542 | 8/1993 | Natarajan et al. | 370/95.3 |
| 5,274,666 | 12/1993 | Dowdell et al. | 375/1 |
| 5,278,831 | 1/1994 | Mabey et al. | 370/94.1 |
| 5,296,849 | 3/1994 | Ide | 340/825.44 |
| 5,381,133 | 1/1995 | Erhart et al. | 340/825.44 |
| 5,382,949 | 1/1995 | Mock et al. | 340/825.44 |
| 5,404,544 | 4/1995 | Crayford | 395/750 |
| 5,475,717 | 12/1995 | Cordonnier et al. | 375/356 |
| 5,696,903 | * 12/1997 | Mahany | 395/200.58 |
| 5,729,680 | * 3/1998 | Belanger et al. | 395/200.1 |
| 5,740,366 | * 4/1998 | Mahany et al. | 395/20.12 |

* cited by examiner

*Primary Examiner*—William Luther
(74) *Attorney, Agent, or Firm*—Burns Doane Swecker & Mathis

(57) ABSTRACT

The present invention is directed to managing power consumption in a wireless frequency hopping communication among a plurality of nodes. For example, the present invention is directed to features such as reducing power consumption of an individual node within a wireless communication system by powering on the transmitter/receiver of the node only when actual transmission/reception is required.

9 Claims, 9 Drawing Sheets

METHOD AND APPARATUS FOR MANAGING POWER IN A FREQUENCY HOPPING MEDIUM ACCESS CONTROL PROTOCOL

CO-PENDING APPLICATIONS

The present application is a continuation-in-part application of U.S. application Ser. No. 08/417,907, filed Apr. 6, 1995, entitled: FREQUENCY HOPPING MEDIUM ACCESS CONTROL PROTOCOL, which is a continuation of U.S. application Ser. No. 08/205,155, filed Mar. 3, 1994 now abandoned, the disclosures of which are hereby incorporated by reference in their entireties.

BACKGROUND OF THE INVENTION

1. Field of the Invention

The present invention relates generally to communication among plural nodes, and more particularly, to managing power in a wireless communication network among nodes using frequency hopping radio signals.

2. State of the Art

Communication systems, such as local area networks (LANs), have achieved widespread use for the exchange of information. These systems include a plurality of data processing nodes, or "agents", which contend for access to a communication medium that interconnects the nodes.

Typical communication networks use hardwired interconnections, such as the local area network communication system described in U.S. Pat. No. 4,661,902 (Hochsprung et al). More recent efforts have been directed to developing wireless communication networks. For example, commonly assigned U.S. Pat. No. 5,231,634 (Giles et al) relates to a communication system for regulating communication among a plurality of nodes, each of which is equipped with a radio transceiver. The '634 patent describes medium access control of a wireless LAN to provide decentralized, peer-to-peer access for all of the agents. A peer-to-peer communication system is one in which all agents can freely communicate without any agent having an advantage over another.

Wireless communication systems require consideration of potential problems which do not exist in hardwired systems. For example, in a wireless communication system, the nodes can be mobile, moving in and out of range with other nodes in the system. The '634 patent is directed to continuously ensuring that all agents possess fair access to the communication system (i.e., to avoid, for example, agents which are physically closer to a given destination from having an unfair advantage due to their signal strength being greater than that of agents physically located further from the destination).

Due to their unique considerations, wireless communication systems have not been developed which can exploit communication techniques such as frequency hopping. Frequency hopping is a known spread-spectrum technique whereby a signal is transmitted using a plurality of frequencies. The exact frequency used at any given time is switched from one frequency to another either in a random or a predetermined sequence.

Frequency hopping techniques provide reliable and secure wireless communication. However, conventional frequency hopping techniques are not readily adaptable to a wireless LAN environment, such as the LAN described in the '634 patent. For example, in frequency hopping systems, synchronization among transmitting and receiving stations constitutes a significant problem. In a LAN environment, synchronization becomes a more significant problem since nodes can move into and out of any number of dynamically changing, reconfigurable communication systems, each of which can have an independently synchronized frequency hopping sequence. There is presently no mechanism for establishing and maintaining synchronization among the nodes present in a dynamically changing, reconfigurable communication system.

Further, there is presently no mechanism for optimizing power consumption in a wireless LAN environment. More particularly, although an exemplary node of a wireless communication network can typically provide both transmission and reception functions, there is presently no method or apparatus for reducing power consumption by controlling the transmitter to be powered only during times of actual transmission. In addition, there is presently no method or apparatus for controlling power consumption which permits a receiving node to power off at certain times and yet still receive information from other transmitting nodes within the communication system.

SUMMARY OF THE INVENTION

Accordingly, the present invention is directed to managing power consumption in a wireless frequency hopping communication among a plurality of nodes. For example, the present invention is directed to features such as reducing power consumption of an individual node within a wireless communication system by powering on the transmitter of the node only when actual transmission is required.

Further, exemplary embodiments of the present invention optimize power consumption by reducing the power supplied to receivers included within the nodes. Exemplary embodiments permit nodes to operate with receivers powered off for a substantial portion of time, while still ensuring that communications from other nodes within the network will be received. In accordance with exemplary embodiments, each node of the communication system can be operated at a desired point on a power/performance tradeoff curve to optimize the relationship between power consumed and performance achieved for that node, independent of other nodes in the communication system. Because exemplary embodiments do not rely upon higher-level software to control the receiver on/off condition, a communication system can be implemented which is application-independent.

Generally speaking, exemplary embodiments of the present invention therefore relate to an apparatus and method for controlling communication of frequency-hopped radio signals among a plurality of nodes in a communication system comprising the steps of: initializing the communication system by synchronizing the nodes to a first node; and placing at least one of said plurality of nodes into an inactive state of reduced power consumption at a first time, wherein said at least one node saves timing information of said first node corresponding to said first time.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

1. Overview

Figure 1:
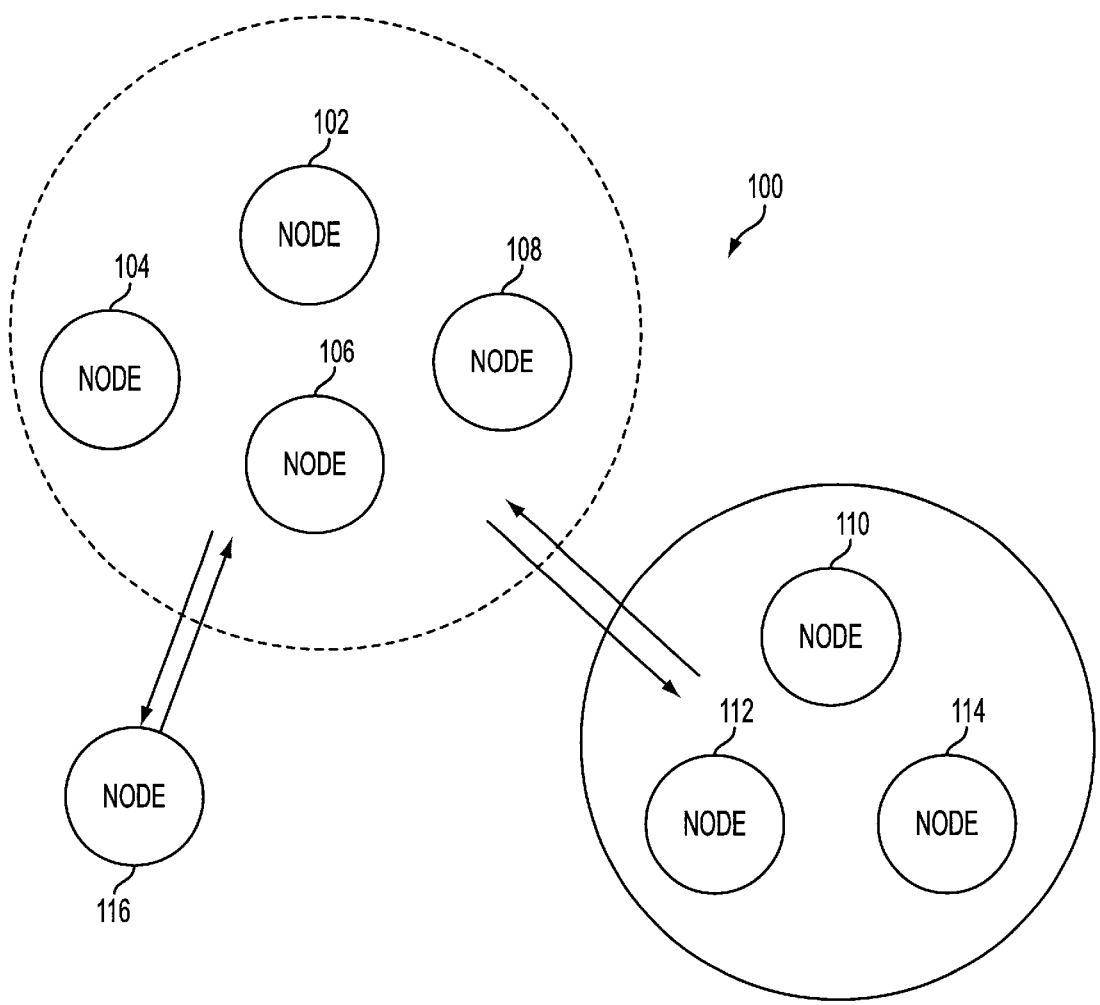
FIG. 1 illustrates a multiple master-node configuration for an exemplary communication system in accordance with the present invention.

FIG. 1 illustrates an exemplary embodiment of a communication system 100 for controlling communication of frequency hopped signals among a plurality of nodes 102–116 (e.g., communication stations). In accordance with the present invention only nodes which are synchronized to one another can communicate with one another. A frequency hopping medium access protocol in accordance with the present invention can be used to control communication among the nodes in server based networks, peer-to-peer networks, ad hoc networks and so forth.

Frequency hopping within a communication system is performed by transmitting/receiving information using any number N of different frequencies (e.g., a prime number, such as 79 or 83 different frequencies). The communication system repeatedly switches frequencies during communication, sequencing through all N frequencies of the hop sequence. The frequencies are switched in either a random or a predetermined sequence (i.e., the hop sequence). A random sequence can be used if a mechanism is in place whereby both a transmitting node and a receiving node use the same random generation technique, or if the transmitter communicates the random sequence to the receiver.

The system remains at each of the different frequencies of the hop sequence for a selected period of time, referred to herein as the hop period. In accordance with exemplary embodiments, the hop period can be fixed at any one of a plurality of different time lengths. For example, in an exemplary embodiment the hop period can be selected to be 100 milliseconds (ms), 200 ms or 400 ms. The hop period is selected by the master node which is in control of synchronization of the communication system at a given time. Once the hop period is set by the master node, it will not vary unless the master node changes the hop period or the communication system resynchronizes to a new master node with a different hop period. All nodes which are synchronized to a particular master node recognize the hop period defined by that master node.

In accordance with the present invention, communication among the various nodes of the communication system is achieved by synchronizing these nodes to the same frequency within the hop sequence, and by aligning the hop periods so that all nodes in communication with one another switch frequencies together. In accordance with exemplary embodiments, synchronization is maintained continuously, and not only when a node attempts to initiate or receive communications. Thus, data and other information can be transmitted whenever the communication system is open (i.e., contention-free), without having to wait for a synchronization period to elapse.

In accordance with the present invention, a decentralized, or distributed method of synchronization is used whereby any one of multiple nodes can control system synchronization and communication. Accordingly, each of nodes 102–116 in FIG. 1 is assigned a hierarchical designation representing a priority of the node to control synchronization of the communication system. The node which controls synchronization at a given time will be referred to hereafter as a "master node". Any remaining nodes which are in communication range of the master node can be synchronized to the master node. For example, node 102 of FIG. 1 can be considered a master node for controlling synchronization of the communication system. However, if node 102 is disconnected (e.g., a mobile communication station which leaves the building), the remaining nodes resolve which node will become the new master node.

In accordance with exemplary embodiments of the present invention, each node is assigned a hierarchical designation representing a priority of the node in contending to become a master node. In an exemplary embodiment, the hierarchical designations are of three different types: (1) a designation of highest priority referred to herein as master station priority; (2) an intermediate priority designation referred to herein as an alternate master station priority which is of a priority lower than that of a master station priority; and (3) a lowest priority designation representing nodes which can never control synchronization.

In the above example, the "master node" can be a node of either master station priority or a node of alternate master station priority. Nodes of priority (3) cannot communicate within a communication system unless a master node is located within their range of communication to control synchronization. The nodes of the communication system resolve which node will be the master node for controlling synchronization within the system at any given time.

As referenced herein, the phrase "communication system" refers to one or more nodes which can communicate with each other. Because the nodes are mobile, one or more dynamically reconfigured sub-systems may exist within the communication system. For example, a first plurality of nodes may be within communication range of one another and controlled by a first master node. A second plurality of nodes within the communication system may be in communication with one another and controlled by a second master node. Depending on the priority assigned to each node, it is possible that a single node which can communicate with some of the first plurality of nodes and with some of the second plurality of nodes will attempt to become a master node. Whether the single node will be successful or not depends on master node resolution. In the following discussion, a general manner by which the nodes communicate using a frequency hopping technique will be presented. This discussion will be broken into two general topics: (1) a format by which the nodes communicate (e.g., initialize and synchronize) using frequency hopping; and (2) a manner by which the node best suited to be the master node for controlling synchronization is resolved.

2. Communication Format a. Hop Period

Figure 2:
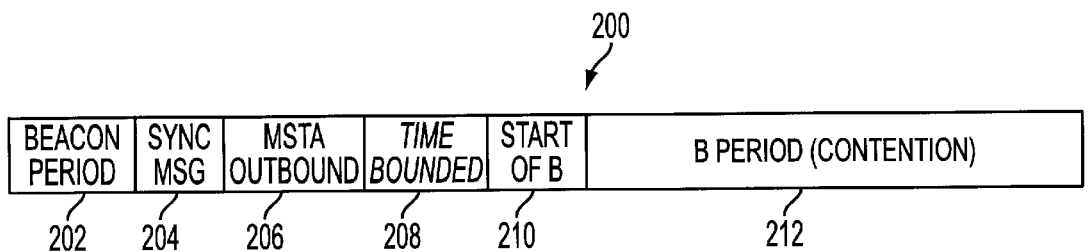
FIG. 2 shows a frequency hop period in accordance with an exemplary embodiment of the present invention.

FIG. 2 illustrates a time oriented relationship of an exemplary hop period 200 with the total time duration selected for the hop period being indicated in a synchronization message 204 (i.e., Sync MSG) from the master node. The phrase "hop period" can be abbreviated to "hop".

A master node controls synchronization of nodes in the communication system by transmitting the sync message. A beacon period is included in the hop period as an aid to facilitate synchronization. The beacon period permits faster synchronization of a node to a master node. A node receiving the beacon can lock onto the frequency of the beckoning master node prior to receipt of a sync message. Each of the sections set forth in the exemplary FIG. 2 hop will now be described.

(1) Beacon Period—The beacon period ensures that there is energy present at the current frequency (i.e., a beacon frequency) long enough for any receiver node to scan all possible frequencies in the hopping sequence. In addition, information is included in the beacon to allow a receiver, once it has detected energy in a particular frequency, to determine whether this beacon has the appropriate channel/subchannel information. To detect a beacon, nodes continuously sequence through all N frequencies of the frequency hopping sequence looking for a beacon transmitted by a master node. The master node sends the beacon for a long enough period of time to enable a node to scan all N frequencies during a scanning period. The length of time the master node sends the beacon to ensure that other nodes will have an opportunity to scan all N frequencies is the beacon period 202.

The beacon period 202 is a fixed duration, contention-free period of time during which a beacon message is broadcast by the master node. This feature ensures that a node of master station priority can immediately transmit information for establishing communication with other nodes of the communication system, without first monitoring the communication medium before transmitting such information. This avoids delays typically required for a node to transmit such information in, for example, a server-based communication system. The master node can be configured to beacon, for example, every 1 to 8 hops for the purpose of optimizing sync times versus overhead for a given installation.

One example of a beacon is a signal which includes the following sequence: a first delay period (i.e., Delay 1); a Preamble; a second delay period (i.e., Delay 2); and a beacon message. The four components of this sequence can be repeated any number of times, end-to-end, for an entire length of beacon period 202. Each of these four components can be described as follows:

Delay 1 This delay is the time it takes to change from switching to send a Beacon Message to the time it takes to send a Preamble message.

Preamble The inclusion of a Preamble makes it easier for nodes to lock onto a particular master node (e.g., a waveform constructed to provide easy lock, which is appended to the start of a data packet).

Delay 2 This is the time it takes to transition from sending a Preamble to sending a Beacon Message.

Beacon Msg. A beacon message corresponds to a short data packet for telling other nodes (a) a channel at which the master node is operating; (b) a subchannel on which the master node is operating; and (c) at which frequency the master node is operating (i.e., which of the N frequencies). The beacon message is optimized for efficient searching by the remaining nodes. The Beacon Message can include, for example, 5 data bytes, 2 flag bytes, and 2 cyclic redundancy check (CRC) or checksum, bytes. Flag bytes represent framing bytes in between which data can be transmitted.

The foregoing beacon sequence is by way of example only, and those skilled in the art will appreciate that any signal or sequence of signals can be used as the beacon. For example, the above beacon could be modified to exclude the preamble and/or the delays. The beacon could merely be an energy bearing signal for indicating to receivers that a sync message will follow.

An appropriate beacon period should be selected to account for any time a receiving node requires to prepare for reception of each frequency of the frequency hopping sequence (i.e., the radio period, or key-up time) and the time the receiver must listen at a frequency of the frequency hopping sequence to detect the beacon message (i.e., beacon listening time).

The radio key-up time can, in an exemplary embodiment, include the time required to receive a preamble within a beacon period. A worst case situation occurs when the preamble has just been missed by a receiving node such that the node must wait for a subsequent preamble to be sent. Thus, a minimum radio key-up time should correspond to a sum of two preambles, delay 2, a beacon message and delay 1.

A beacon listening time corresponds to an amount of time required for a node to listen at the frequency at which the preamble was detected during a scan through all N frequencies. The beacon listening time must be long enough to guarantee that a beacon message sent at that frequency will be detected. A worst case occurs when a node fails to detect a beacon message such that a receiver of the node must wait for a subsequent beacon message. Therefore, in an exemplary embodiment, a beacon listening time corresponds to a sum of two beacon messages, delay 1, delay 2 and 1 preamble.

A beacon period can be calculated as the number N of available frequencies in the frequency hopping sequence multiplied by the radio period, plus the beacon listening time. Thus, a beacon period represents the time required to switch through each of the N frequencies, prepare the radio, and listen at the beacon frequency long enough to detect a beacon message.

In summary, the beacon message broadcast during the contention-free beacon period permits other nodes within the communication system to determine that they have identified a correct frequency of the hopping sequence, as well as the channel and subchannel with which the master node is broadcasting. However, the nodes controlled by the master node also need to determine when to switch frequencies (i.e., synchronize their hop periods), since frequency switching must occur for all stations in the communication system at the same time. Synchronization information for synchronizing to a hop period of the master node is not included in the beacon message. Rather, information pertinent to synchronizing is included in a sync message (i.e., Sync MSG).

(2) Sync MSG—Sync message 204 enhances the ability of a node to quickly synchronize to a communication system. Although a beacon period is only included in hop periods which have been designated to include a beacon (e.g., once every 8 hops), the sync message is included at the beginning of every hop period, regardless of whether a beacon message is broadcast within the hop period. A master node may only broadcast its contention-free beacon once every x (e.g., 8) hop periods to minimize its contention-free control of the communication medium. However, Sync message 204 contains pertinent information to allow nodes to sync to the master node, and this information can be broadcast on every hop so that nodes can update their hop interval times and adjust for drift. The sync message can also contain pertinent information concerning a contention-free outbound period during which a master node can broadcast information to all nodes of the communication system without contention.

When a beacon message has been located, nodes can identify which channel and frequency (i.e., hop number) the master node is currently on to aid in the synchronization process. The sync message is used to transmit a hop timer count which reflects a count remaining on a hop timer of the master node when it sets up the sync message. The hop timer tracks the time duration of a hop period. Based on the remaining count transmitted by the master node in the sync message, a node can subtract the appropriate count for processing and transmission delays, and then write the remainder into a hop timer register so that its hop timer interrupt will occur at approximately the same time that a hop timer interrupt occurs in the master node. This allows the node to synchronize its hop period to the hop period of the master node.

(3) OutBound—A master node can communicate messages to all nodes with which it is synchronized in a communication system during a contention-free outbound period 206. The outbound period 206 can be used by master nodes to off load any queued data without contention. This allows optimum transfer of data for the master node, and can be used for configurations where the master node is, for example, also the server in a LAN. The outbound period is of variable length as required. For example, this period can be expanded in hops which do not include a beacon period. A master node can be configured to transmit a maximum number of messages that can be transferred during this period, or any number of messages less than the maximum, with the minimum equal to 0.

(4) Time Bounded—An optional, contention-free, time bounded period 208 can support time bounded services.

The period of time represented by the beacon period, the sync message period, the outbound period and the optional time bounded period collectively represents a first period of time, referred to herein as a contention-free "A" period. The remaining portion of the hop period is a contention period during which nodes synchronized to one another within a communication system vie for access to the communication medium. This contention period is referred to herein as a "B" period which is initiated by what is referred to herein as a "start of B". During the contention period, nodes can contend for access to the communication medium using a contention protocol such as that described in commonly assigned U.S. Pat. No, 5,231,634, the disclosure of which is hereby incorporated by reference in its entirety.

(5) Start of B—A start of B message 210 is broadcast by the master node to announce the start of a "B period" to all nodes.

(6) B Period—A "B" Period 212 is a random access contention period during which the master node and all other nodes can communicate with one another.

Having discussed the contents of a hop period used by nodes to communicate in accordance with exemplary embodiments of the present invention, attention will now be directed to the scanning period. A scanning period corresponds to a period during which a node scans for a beacon to synchronize to a master node. A scanning period is also used to search for beacons to detect the existence of other nodes (i.e., of master station priority or alternate master station priority) transmitting beacons.

b. Scanning Period

A scanning period corresponds to the time a non-master node searches before determining that a master node does not exist. For example, when a master node sends a beacon at least once every 8 hops, nodes must locate a beacon within that period. In a normal hopping sequence, a transition from one frequency to a next frequency occurs in a predetermined non-sequential order in accordance with exemplary embodiments. However, when a node is searching for a beacon, it will begin scanning with the current frequency it is on and go up in frequency in sequential order until the Nth frequency is scanned. The hopping sequence then wraps around to the first frequency and continues through the sequence of frequencies again.

c. Frequency Drifting

Hop timers included in the nodes are resynchronized every hop period to correct for errors associated with tolerances of the timing references for each node. Each hop period, synchronized counters may be off by several counts, and if nodes are not resynchronized often, they can drift. Because the nodes are resynchronized every hop period, frequency drifting is corrected in each hop period.

However, exemplary embodiments can also account for frequency drift at the beginning of each hop period. For example, the master node can delay sending the sync message for a predetermined period of time referred to herein as a drift period. The master node need not delay sending the beacon during hops which include a beacon period because it is not important for synchronized nodes to receive beacon messages. With the exception of the beacon, no data is sent at the beginning or end of a hop period within the drift period.

The drift period differs depending on the hop period length. In exemplary embodiments, sync messages can be missed for a maximum of 4 hop periods before a determination is made that synchronization has been lost. In this case, the error rate must be multiplied by 4. The result is multiplied by 2 to account for the master node being off by a gain of 100 parts per million (PPM) while the node is off by a loss of 100 PPMs, creating an error rate of approximately 0.08%.

d. Message Format

To provide communication between nodes using frequency hopping and synchronization, a protocol for transmitting data and other information can be established in accordance with the aforementioned U.S. Pat. No. 5,231, 634. In accordance with exemplary embodiments, data can be transmitted in frames, with different frame types being employed as necessary. Each frame can include a frame header, and additional remaining unused bits which are reserved and set to zero unless otherwise specified.

In accordance with exemplary embodiments, a standard frame header can be used on all frames with the exception of a beacon message. A standard frame header includes a flag to indicate the start of the frame, an identification code of a transmitting node (e.g., whether the node is a master station, alternate master station, or a low priority station) control information, (e.g., transmission power level, data compression technique, radio speed, and so forth), medium access control length (e.g., frame length from node/frame up to CRC), security information, and channel/subchannel. The node/frame type portion of the standard header can specify antenna diversity (i.e., indicating which antenna is to be used as the sending node), the node type (i.e., master station, alternate station or station) and the frame type. Different types of frames include a beacon frame, a resync frame, a resync acknowledgement frame, a sync frame, a request-to-send frame (RTS), a clear-to-send frame (CTS), a request media access frame (RMA), a medium access control acknowledgement frame (MACK), a logical link control acknowledgement frame (LACK), a data message frame, a wakeup message frame, and so forth.

Source and destination addresses for information included in the frame can be included in an extended header definition specified by the user. The standard frame header can include a header followed by a destination address and a source address.

A start of B message can be sent by a current master node to indicate the start of a contention period. Nodes must hear the message to participate in the contention period, and nodes, upon receiving this message, will use a slot definition and apply it to the current hop. The start of B message contains a field which defines the maximum time to wait for successive start of B messages on successive hops before starting contention without it.

A beacon message can be energy (e.g., a message) which is sent at the beginning of some hops by the master node. In an exemplary embodiment, the beacon message can be a relatively short message that is repeated several times. A beacon message can include a flag to indicate the start of the beacon message, a frame type indicator to confirm that a beacon message is being transmitted, a security identification of the master node sending the beacon message, the channel and subchannel of the master, a CRC portion and an ending flag.

A resync message can, in accordance with exemplary embodiments, have one of two versions. A first version is a broadcast message sent by a master in an outbound period to inform all nodes synchronized to the master node that a second master node has been located to which all other nodes should synchronize. This first version of the resync message requires no acknowledgement. A second version of the resync message can be a directed message from a node designated as an alternate master to a first master station node during the contention period to inform the first master station that a second master station node exists. The alternate master node sends information about the second master to the first master station node. Upon receipt of this information, the first master station sends a resync acknowledgement message to inform all nodes of the identity of the new master (i.e., the identity of either the first master node or the second master node, depending on a master resolution protocol). This message includes the medium access control extended information, the channel/subchannel of the new master, the hop number which serves as an index into the channel frequency table to find a sync message, a hop duration, CRC information and an ending flag.

A resync acknowledgement message is sent from a master node and broadcast to all stations. This acknowledgement message can be sent in response to a node sending a resync message to the master node, and it informs all nodes synchronized to the master node to resynchronize to a new master at the frequency specified in the message. Thus, a resync acknowledgement message includes an extended medium access control, a channel/subchannel of the new master, a sync hop number used to locate the sync message, a hop duration, a new master identification to which all communications should synchronize, a CRC portion and an ending flag.

The Sync message sent by a master node at the beginning of each hop period contains information for nodes to adjust their hop timer counters to maintain synchronization from hop to hop. A synchronization message includes an extended medium access control portion, a node name (e.g., ASCII) of the master node, a control portion for defining the hop (i.e., whether next hop will/will not contain beacon, whether hop is dedicated to searching, or whether regular hop), a hop number, a hop duration, a CRC portion and an ending flag.

3. Master Resolution Protocol a. Initialization

In accordance with the present invention, exemplary embodiments include a step of initializing the communication system by synchronizing the nodes to a first node. Initialization of a node designated with a master station priority is relatively straightforward. When a node designated with a master station priority is requested to initialize, it immediately sets its hop timer and starts beckoning and sending sync messages. Because it is of the highest priority, it does not search for other nodes of master station priority before attempting to assume a role as a master node itself.

Non-master nodes (e.g., a low priority node or a node of alternate master station priority which is not currently operating as a master node) initialize by first scanning for a beacon during a scanning period. Depending on a configuration of the communication system, a node will scan for a beacon which matches a subset of its channel and subchannel (as well as any security identification information).

Figure 5:
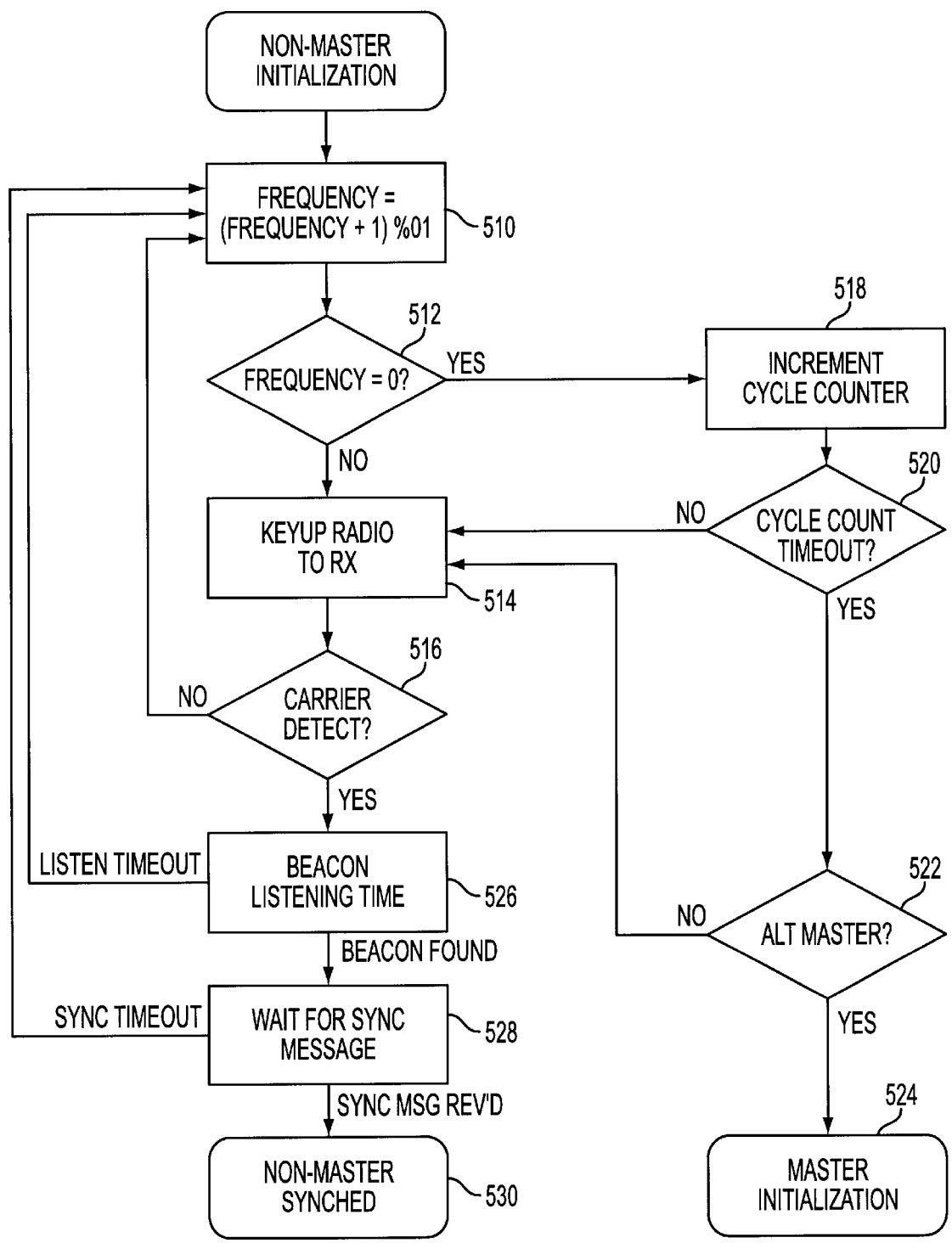
FIGS. 5–9 show flow diagrams of an exemplary initialization, synchronization and master node resolution operations in accordance with exemplary embodiments of the present invention.

FIG. 5 illustrates an exemplary flow chart depicting operation associated with initialization of a non-master node. As illustrated in FIG. 5, a non-master node, when asked to initialize, initiates a scan period wherein the non-master node begins scanning for a beacon by keying-up its receiver to sequentially receive each frequency of the hopping sequence. As illustrated by steps 510 and 514, the receiver is first keyed-up to receive one of the frequencies of a hopping sequence (i.e., the current frequency at which it is set up for). If a carrier is not detected, operation returns from decision step 516 to decision step 510 wherein the next frequency in the frequency hopping sequence is selected.

In an exemplary embodiment, the scanning can continue by sequencing through each frequency up to the frequency in the hopping sequence. The sequence of repeatedly setting up to receive one of the frequencies in the hopping sequence continues until either a carrier is detected in step 516, or all frequencies of the hopping sequence have been scanned. In the latter case, operation exits step 512 to increment a cycle counter in step 518.

Referring to the decision step 516 of FIG. 5, if the node detects a carrier from a master node during the scanning period, the node then attempts to synchronize to that master node. This is reflected by initiation of a beacon listening time in step 526 wherein the node listens for a beacon message to detect channel and subchannel information of the master node. If no beacon is identified within the listening time, then the flow chart returns to the scanning mode represented by step 510. Alternately, if a beacon is identified in step 526, then the node will synchronize to the master node upon detection of a sync message in step 528. If no sync message is received within a timeout period, the node again rescans via step 510. Alternately, if the sync message is received, the node synchronizes to the master node which had transmitted the beacon and sync message, whereby synchronization is established in step 530.

In accordance with exemplary embodiments described herein, a node should be synchronized within a maximum time period corresponding to the scanning period; i.e., within a number of hops (e.g., x hops) when the master sends a beacon once every x hops. Any number of scanning cycles can be included in a scanning period to locate a signal transmitter from another node. A cycle count timeout can be the scan period divided by the product of N times the radio-key-up time, as represented by step 520. A rescanning via steps 510–516 will be performed until such timeout occurs.

Once a timeout occurs in step 520, the node determines that it was not able to initialize by synchronizing to another master node in the allowable time period. If the node is of the lowest priority, it can attempt to rescan as represented by the "no" decision path from step 520. Alternately, the node can discontinue scanning and report that a master node could not be located. If the node is of an alternate master station priority, it can attempt to assume control of the communication system by becoming a master node as represented by decision step 522. In this case, the node initiates a master node initialization as represented by step 524.

Figure 6:
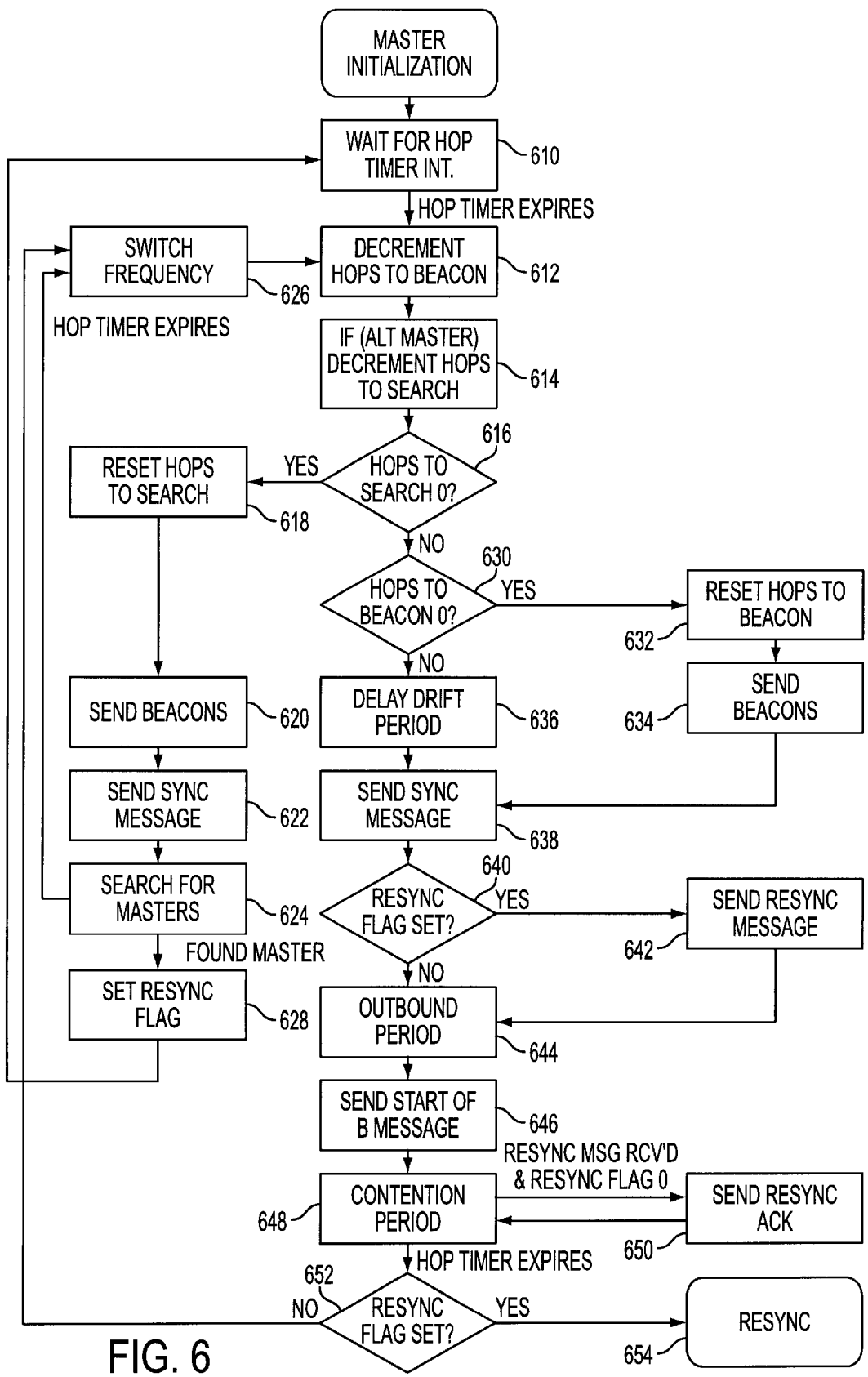

As illustrated in FIG. 6, a master node initializes by attempting to control (i.e., establish) synchronization within the communication system. Nodes of alternate master station priority also will perform the master node synchronization control steps illustrated in the flow chart of FIG. 6 upon failure to synchronize to a master node in accordance with the FIG. 5 flow chart.

As described previously, a node of master station priority initializes by keying up to send its beacon in its first available beacon period. On the other hand, a node of alternate master station priority only keys up to send a beacon after a search for other beacons during a scanning period is determined to have been unsuccessful.

According to FIG. 6, the first step of synchronization control during initialization by a master node is represented by step 610 wherein the master node waits for a hop timer interrupt. The hop timer interrupt is generated when the hop timer expires, and is used to trigger a decrement of the number of hops prior to entering a beacon period, as reflected in step 612. When the node is of an alternate master station priority, it also decrements a count representing the number of hops prior to searching for another master node, as represented by step 614.

If the value of the number of hops to search reaches zero as represented by the decision step 616, the number of hops to search is reset in step 618 and the alternate master station node searches for other master nodes.

Figure 3A:
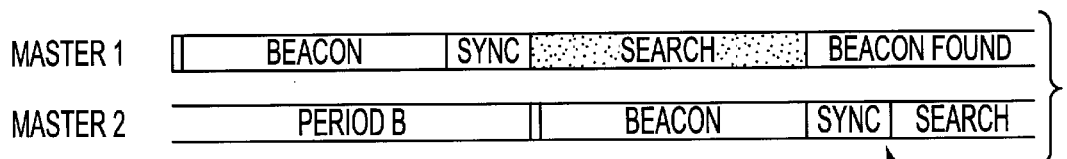
FIGS. 3A–3C illustrate resynchronization of a communication system to a second node in accordance with an exemplary embodiment of the present invention.
Figure 3B:
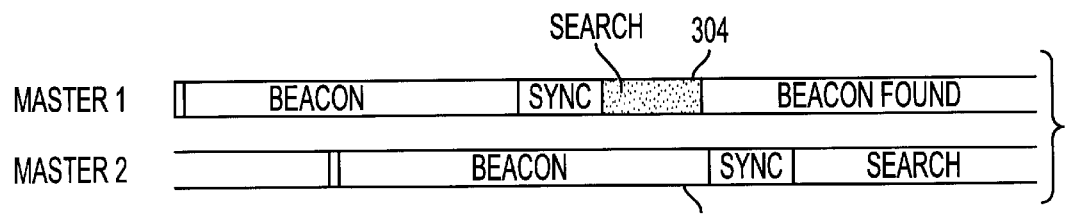
Figure 3C:

To perform a search for other master nodes, a master node sends a beacon period 620 followed by a sync message 622 which has two significant attributes. This sync message sent by a master node notifies all nodes of the communication system that the current hop has been dedicated for searching. In addition, the sync message sent by the master node includes a hop timer count adjusted to scan an entire hop period. If the count is not adjusted, a search time 624 will not correspond to a full hop period, such that another master node beacon message could possibly be missed. FIG. 3C illustrates a search hop period 306 which is longer than other hop periods by an amount corresponding to the beacon period plus the sync message.

Figure 9:
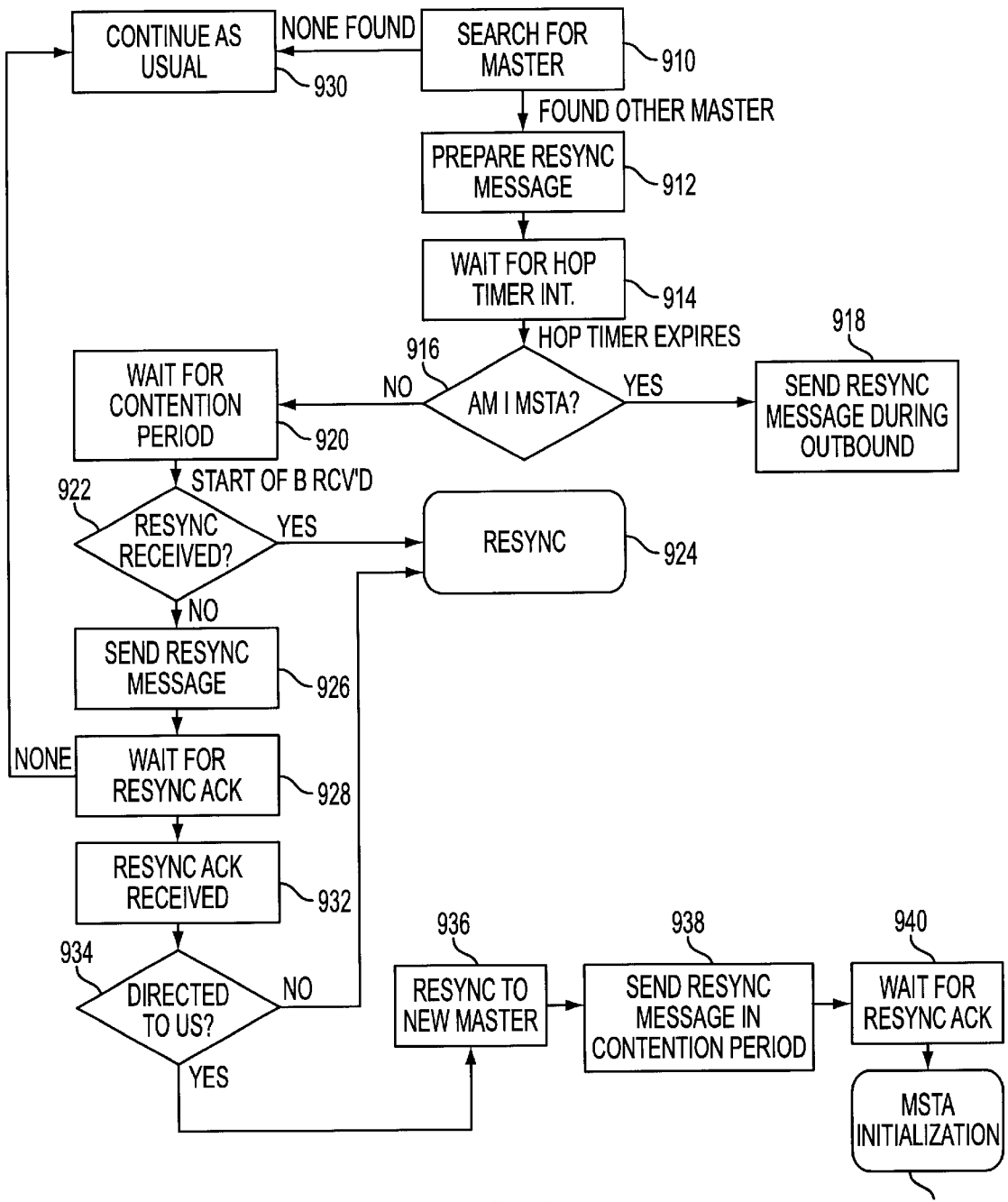

As illustrated in FIG. 9, if another master node is not located during a search for multiple master nodes, the hop timer interrupt brings the master node out of the scan phase and the master node continues with its normal hopping sequence (step 626).

However, if the master node locates a beacon message during its scan, it sets a resync flag in step 628 and awaits the sync message from the other master node and then prepares a resync message. After extracting information from the sync message, the first master node waits for its hop timer interrupt in step 610 and then sequences to its next operating frequency. It proceeds normally, sending a beacon if necessary and a sync message. However, in the outbound portion of the hop period it sends a resync message (step 642). The destination address of this message is set so that it is broadcast to all nodes. The resync message contains information which allows nodes to synchronize to a new master quickly. Further, the resync message informs all nodes to synchronize to a new master when the current hop period ends.

More particularly, where the node is either an alternate master station which has assumed the role of a master node or is a node of master station priority, operation flows to decision step 630 once the number of hops to beacon has been decremented to zero. The number of hops to beacon is then reset in step 632 and a beacon is sent in step 634. On the contrary, if the number of hops to beacon was not set to zero in step 630, indicating that the current hop period does not include a beacon period, then a delay drift period is performed in step 636.

After the delay drift period of step 636 or the sending of a beacon in step 634, a sync message is sent in step 638. In step 640, a determination is made as to whether the resync flag was set in step 628. If the resync flag was set in step 628 (i.e., another master node was located), then a resync message is broadcast in step 642 to inform all nodes that another master node exists to which all nodes should synchronize. This resync message is based on the detection of another master in step 624, and requires no resync acknowledgment. Alternately, if the resync flag was not set or if a resync message from step 642 is to be sent, an outbound period is entered in step 644, followed by a start of B message in step 646 and a contention period in 648. Because FIG. 6 relates to master nodes, the resync message of step 642 can be sent in a contention-free outbound period.

During the contention period, the node can send a resync acknowledgement in step 650 to confirm the identity of a new master node. During a subsequent hop period, the node will resync to the new master node. More particularly, upon expiration of the hop timer, a decision is made in step 652 whether the resync flag had been set. If the resync flag has not been set, operation returns to step 612 to initiate the next hop period via the switch frequency step 626. Alternately, if the resync flag has been sent, then a resync operation occurs as represented by step 654.

Figure 7:
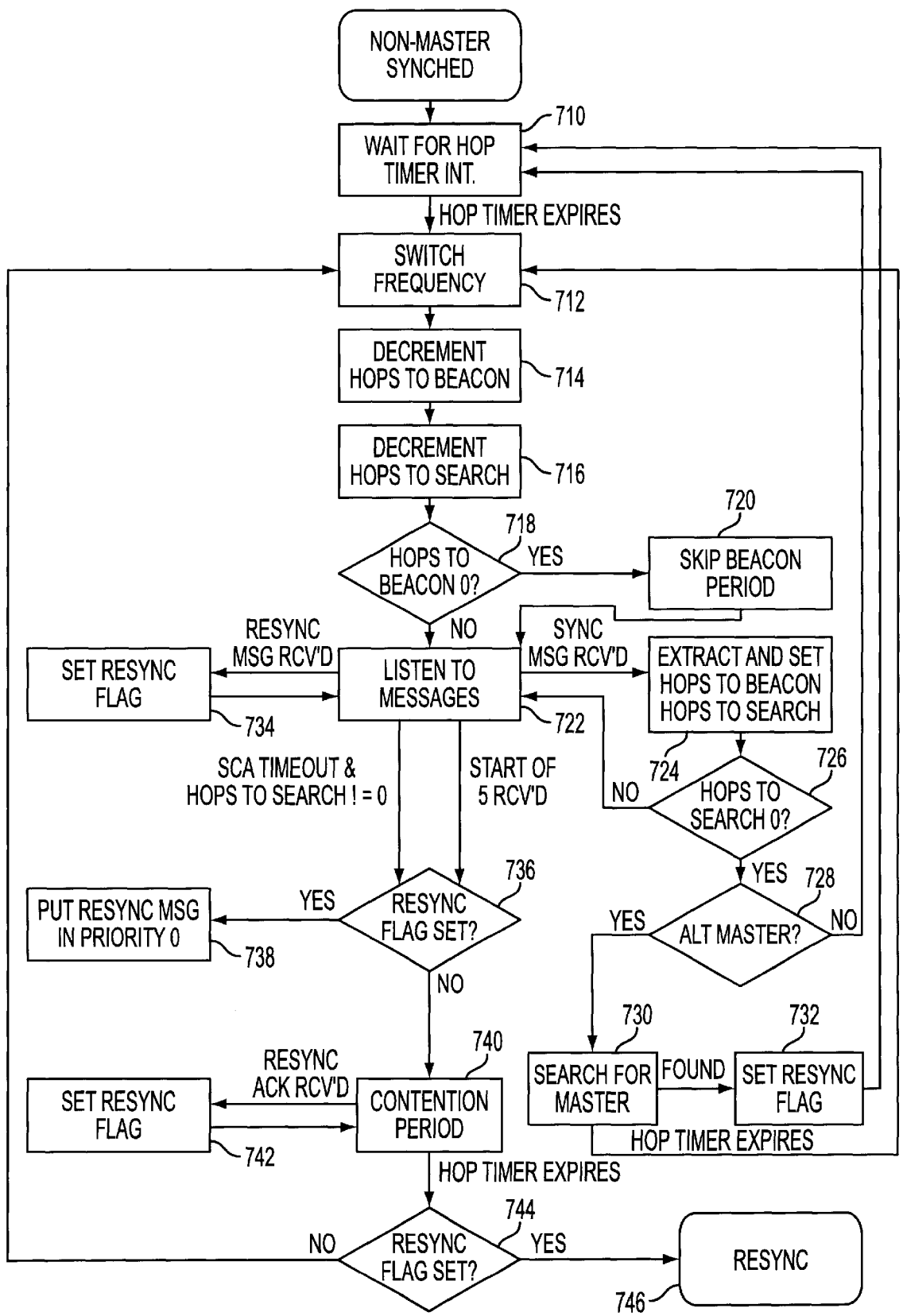

FIG. 7 illustrates a synchronization operation for a non-master node. As represented by steps 710 and 712, the non-master node switches frequencies within the hop sequence upon each hop timer interrupt. Further, the non-master node decrements the number of hops to beacon and decrements the number of hops to search in steps 714 and step 716. Because the node is a non-master, if the number of hops to beacon is zero, as represented by the decision step 718, the beacon period is skipped in step 720.

The node subsequently enters a listening period in step 722 to receive messages from the master node during the contention-free sync message and outbound periods of the master. When a synchronization message is received, the node extracts and sets a number of hops to beacon and a number of hops to search from the master node in step 724. These values are then used to set similar values within the non-master node.

If the number of hops to search is zero, and the node is of an alternate master station priority, as represented by steps 726 and 728, then a search for a master node is performed during a scanning period in step 730. If a master is found, a resync flag is set in step 732 and operation returns to step 710. The resynchronization process starts in the next hop period. If a master is not located in step 730 (i.e., the hop timer expires), operation returns to step 712 to switch to the next frequency and initiate a new hop period.

If the node is not of alternate master station priority, as represented by the "no" decision path from step 728, operation returns to step 710 to initiate the next hop period without searching for other master nodes. Rather, the node is of the lowest priority, and will resynchronize to a new master upon receipt of a resync message. If a resync message is received (i.e., a message instructing the node to synchronize to a new master node), then the resync flag is set in step 734 and operation returns to listening step 722.

Further, if the number of hops to search was not decremented to zero in the decision step 726, operation returns to the listening period 722.

During the listen period 722, the start of B period can timeout or the start of B can be received. If the start of B period times out and the number of hops to search is zero, or the start of B period has been indicated and such indication has been received during the listening period 722, then a decision step 736 is used to determine whether a resync flag has been set. If the resync flag was set in response to receipt of a resync message identifying existence of another master in step 734, a resync message identifying to the current master that the other master exists is placed into a priority queue as represented in step 738. Alternately, if the resync flag was not set in step 736, then a contention period is entered in step 740. If a resync acknowledge message identifying a new master node has been received from another node during the contention period, then the resync flag is set in step 742 during the contention period 740.

Once the contention period ends (i.e., the hop timer expires), the determination is made in step 744 as to whether the resync flag has been set in step 742 and if so, a resync operation is performed as represented by step 746. Alternately, operation returns via the "no" path from step 744 to initiate a subsequent hop period via the switch frequency step 712.

The initialization sequence for a node assigned a priority designation of an alternate station is randomized in an exemplary embodiment. In the event all nodes are initialized at the same time, alternate stations can scan an extra amount of time in addition to the regular scanning period discussed previously. For example, a value corresponding to the least significant 6 bits of a node's identification code can be multiplied by 25 ms. The result is the extra scanning time of an alternate master station, and the maximum initialization time for nodes designated alternate master stations thus becomes 4.78 seconds (i.e., 63 multiplied by 25 ms plus 3.2 seconds). Although this calculation does not guarantee that only one master node will exist, it represents an effort to reduce the number of multiple masters so that selection of a single master node can be resolved more efficiently.

When synchronization of any of the foregoing nodes to the communication system is lost, or when a node is instructed to synchronize to a new master, an effort is made to resynchronize. More particularly, all nodes receive the sync message from the master node on each hop and reset their timers upon receipt of the sync message. If a node does not receive a sync message for a set number (e.g., 4) of consecutive hops, synchronization with a master node is considered lost. To resynchronize, the node which has lost synchronization scans for a master node beacon. If a master node is not located within the scanning period, the node which has lost synchronization performs an initialization procedure as described previously.

Figure 8:
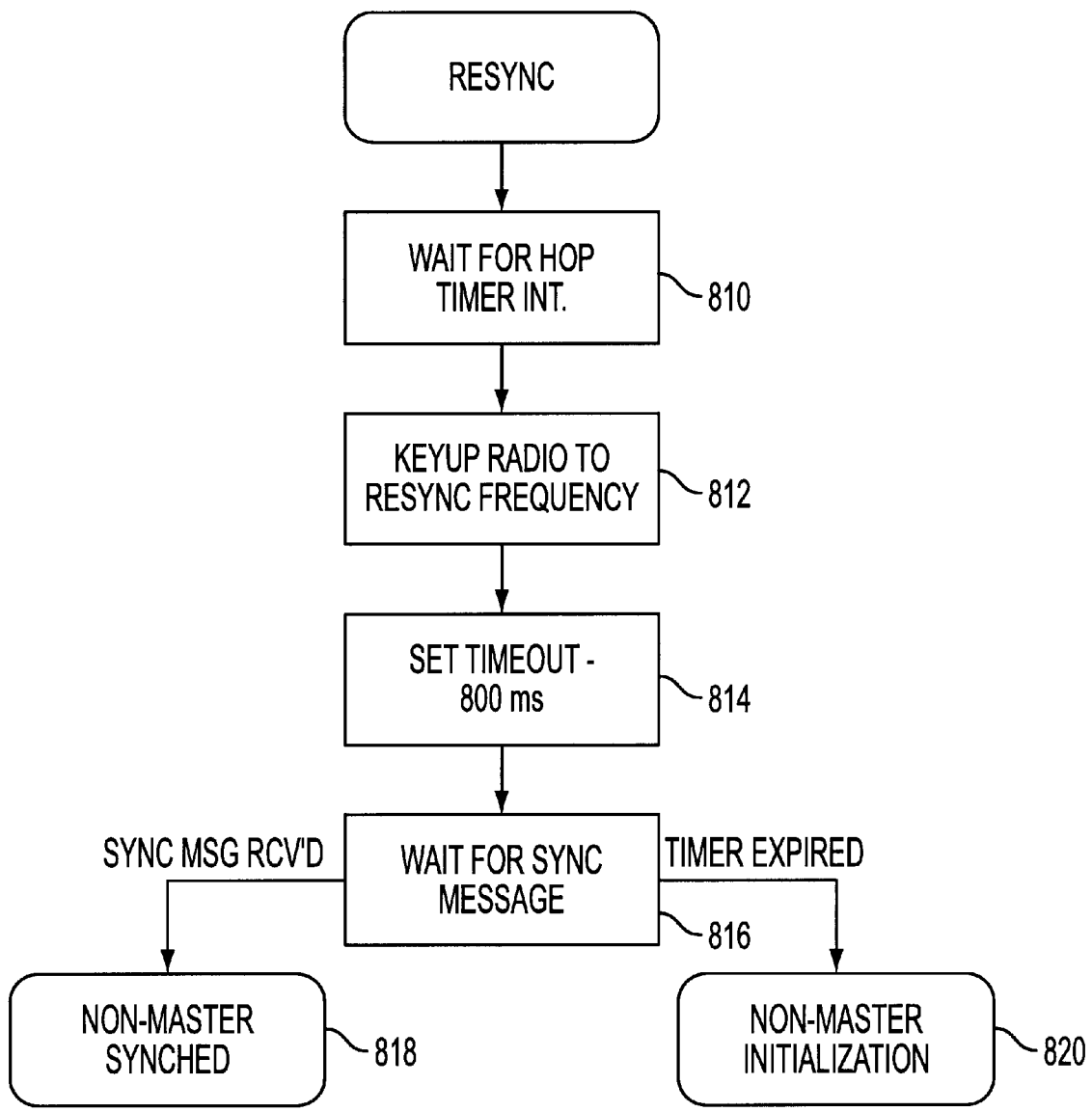

FIG. 8 illustrates an exemplary operation of a resynchronization operation. As represented by step 810, a resync operation is initiated in a subsequent hop period as represented by waiting for a hop timer interrupt. Once received, the node is keyed-up to the resync frequency in step 810 and a timeout is set (e.g., 800 milliseconds as illustrated in step 814). Afterward, the node waits for receipt of the sync message in step 816. Once received, the non master node can be considered synchronized as represented by step 818. Alternately, if a timer expires, the node reinitializes as represented by step 820, thereby assuming that it has lost any ability to resynchronize.

b. Searching for Multiple Master Stations (Master Stations)

As described above, exemplary embodiments of the present invention scan the communication system to search for and locate a second node to control synchronization of the communication system (i.e., scan the communication system in search of multiple master nodes). To synchronize all nodes of a communication system, nodes of alternate master station priority (i.e., either acting master nodes or not) will occasionally search the communication system to determine whether another master node exists within the system. To ensure that another master node can be located, the scan period is set to cover an entire beacon period. To avoid eliminating communication transfers for a significant amount of time, a prime number Y can be chosen such that every Y hops, the master node will search for a beacon message. If the other master node beacons every X hop periods, the present master node should locate the other master node within X multiplied by Y hop periods.

FIG. 9 illustrates an exemplary flow chart depicting operation of a master node resolution operation. In step 910 of FIG. 9, a given node will search for other masters. If another master is found, a resync message is prepared in step 912 to inform a current master node of the existence of another master node. The interrupt is received upon expiration of the hop timer.

If the node is of master station priority (see step 916), it sends a resync message during its contention-free outbound period as represented by step 918. Alternately, if the node is not of master station priority (e.g., of alternate master station priority), the node waits for a contention period as represented by step 920.

Upon receipt of the start of B message, the node determines whether a resync message has been received in step 922. If so, the node initiates a resync operation as described previously and as represented by step 924. Alternately, if a resync message had not been received in the decision step 922, the node sends a resync message in an effort to inform the master mode of another detected master node (see step 926). The node then waits for a resync acknowledgement in step 928 identifying which node will be the new master.

If a resync acknowledgement was not received in step 928, the node continues operation as usual, remaining synchronized to the master node with which it was originally synchronized (see step 930). Alternately, if a resync acknowledgement was received, this verifies to the node that it should resynchronize to a new master or assume a role as a master node (see step 932). Upon receipt of a resync acknowledgement, the node determines whether the resync acknowledgement was indeed intended for it to assume control, as represented by decision step 934. If not, the node performs a resync operation to the current master node as represented by step 924.

If the resync acknowledgement was received, the node addressed in the message resynchronizes to a new master identified in the resync acknowledgement as represented by step 936. A resync message is sent during the contention period (i.e., the B period) of the new master node as represented by step 938. Afterward, the node waits for a resync acknowledgement in step 940. If it is to become a master node, it performs a master node initialization operation in step 942.

There is a possibility that when a first master node scans, a second master node will also be scanning, whereby the two master nodes scan together and never locate each other. To minimize a possibility of this occurrence, master nodes can, in an exemplary embodiment, always send beacon messages before scanning to allow master nodes which are at least a beacon period plus a sync message apart in their hop synchronization to detect each other. This is illustrated by the transmission characteristic 300 illustrated in FIG. 3A for each of a first master node (i.e., labelled master station 1) and a second master node (i.e., labelled master station 2).

During a power up sequence where all nodes are initialized concurrently, it is also possible that master nodes could be synchronized so closely as to create a problem in identifying each other. To resolve this occurrence, some randomness can be added when a node is delaying to become a master node. Further, when a node of alternate master station priority scans, it can begin scanning on its own frequency first to allow master nodes to detect each other if they are unsynchronized by more than a beacon listening time plus a sync message time (e.g., a few hundred milliseconds). As illustrated in FIG. 3B, if the two master nodes are offset in synchronization by a relatively small amount, a small window 302 of the beacon will fall into the search time 304. If the master node searches its own frequency first, it should find another master node which is in close synchronization with itself.

As illustrated in FIG. 9, if another master node is not located during a search for multiple master nodes, the hop timer interrupt brings the master node out of the scan phase and the master node continues with its normal hopping sequence (step 930 in FIG. 9). However, if the master node locates a beacon message during its scan, it awaits the sync message from the other master node and then prepares a resync message (step 912). After extracting information from the sync message, the first master node waits for its hop timer interrupt (step 914) and then sequences to its next operating frequency. It proceeds normally, sending a beacon if necessary and a sync message. However, in the outbound portion of the hop period it sends a resync message (step 918). The destination address of this message is set so that it is broadcast to all nodes. The resync message contains information which allows nodes to synchronize to a new master quickly. Further, the resync message informs all nodes to synchronize to a new master when the current hop period ends.

c. Searching For Multiple Nodes (Alternate Stations)

At the beginning of every hop period, the current master node sends out a sync message which nodes use to readjust their timers to remain synchronized (see step 638 in FIG. 6). To perform a search for other master nodes in accordance with step 910 of FIG. 9, a sync message is sent in step 622 of FIG. 6 which includes a control field that can be set to inform the other nodes that the entire hop period is a master node search phase dedicated to search for another master node; i.e., there will not be an outbound period or contention period B in the current hop. Nodes which are not configured as alternate stations remain idle, but nodes configured as alternate master stations, along with the current master node, scan for another master node. Nodes designated as alternate master stations search to detect a master node that is out of range with its master node. In this case, the alternate station becomes the master node. Thus, any alternate master station must be capable of reporting back to its own master node, synchronizing to a new master node, and taking over as master node.

An alternate master station scans for a beacon in the master node search phase represented by step 624 of FIG. 6 and step 910 of FIG. 9. If no beacon messages are found, it returns to its normal procedures when it receives its hop timer interrupt (step 930). If the alternate finds a beacon message during its scan, it waits for the sync message of the newly found master and then prepares a resync message to identify the second master node which is located to the current master node (step 912). After extracting information from the sync message, it waits for its hop timer interrupt (step 914) and communicates the resync message back to its original master node.

If the node is itself a master node which detected another master during the scan hop, it will send a resync message in the outbound period step 642 in FIG. 6 and step 918 in FIG. 9). However, if the node is of alternate master priority, it must wait for the contention period (step 920). If the node receives a resync message from the master node, it proceeds normally until it receives its hop timer interrupt, at which point it attempts to synchronize to a new master (step 924). Alternately, if a resync acknowledgement message identifying a new master node is not received, the alternate master station will retry sending the resync message to the master node in the contention period (step 926).

If a resync acknowledgement message is received (step 928), but another alternate master station's identification code is given as the new master, the alternate master station will not become a master and will resynchronize at the end of the hop period (i.e., return to step 924). If the alternate master station receives the resync acknowledgement message with its own identification code given as the new master, it waits for its hop timer interrupt and synchronizes to the new master (step 936). Once synchronized, it waits for the contention period B where it sends a resync message to the newly synchronized master node (step 938). If the alternate master receives an acknowledgement for another identification code to become master, it will resynchronize. However, if it receives a resync acknowledgement for it to become a master node (step 940), it waits for the hop to end and takes over as master. It beacons on this hop to synchronize other scanning stations as soon as possible (step 942).

d. Synchronizing to a New Master (Resync)

The simplest way for nodes to synchronize to a new master is to search for the beacon. However, this would make communication between these nodes impossible until they find and synchronize to the new master. If maximum sync times are chosen to be very fast (hop periods are short or beacons are sent frequently), this method would be acceptable. However, if the maximum hop period (400 ms) is used and beacons are sent minimally (once every 8 hops), communication would be held off for 3.2 seconds.

Figure 4:
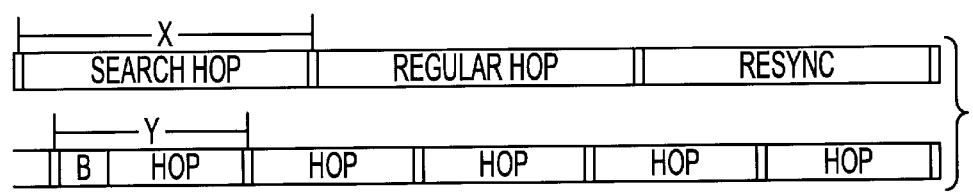
FIG. 4 illustrates a search for multiple master nodes in a communication system in accordance with an exemplary embodiment of the present invention.

In accordance with alternate exemplary embodiments, nodes can synchronize to a new master (FIG. 8) by informing the nodes which hop number the new master will be at so they can scan for the sync message at that frequency. To calculate the hop number, the master node includes a few bits in the sync message of step 816 to indicate the hop period it is using (100, 200, or 400 ms), as well as the current hop number. As illustrated in FIG. 4, if the hop period of the current master node is X and the hop period of the new master node is Y, the maximum number of hops the new master can make is the number it can make in 2 X hop periods. That is, the worst case occurs when the scanning node detects the beacon message at the beginning of its search period. The scanning node has to wait for its hop period to expire and transmit a resync message to the other nodes on the next hop. The nodes resynchronize after this hop period.

The new master node can move at most $((2*X)/Y)$ hops from its current hop. This number is added to the new master's current hop number and sent in the resync message. Nodes receiving the resync message switch to the correct frequency and search for the new master's sync message when their hop expires. The worst case occurs when a node finds a new master near the end of the search period. In this case, although 2 X hops were calculated in, the other master can only move X/Y hops. Therefore, in the worst case, a node waits 1 X hop period before finding the sync message of the new master. This is a large improvement since nodes are only out of communication for a single hop period at the most (a maximum of 400 ms).

For completeness, it should be noted that a node may not receive a resync message that a master broadcasts, or may not find the sync message of a new master while trying to resynchronize. In the first case, (if a node does not receive a transmitted resync message) the node will wait for a sync message on the following hop, but will never receive one because the master node is synchronized to another master node. After missing four sync messages, the node will reinitialize itself by scanning for a beacon. In the second case, a node expects to find the sync message of a new master within 1 hop period. If the node does not find the sync message within that time, it will also reinitialize itself by scanning for a beacon.

Referring to FIG. 1, exemplary operation of a communication system in accordance with the present invention will be described. The communication system 100 of FIG. 1 can be considered to include a first subsystem (e.g., network) represented as a first set of nodes 102, 104, 106 and 108, of which nodes 102, 104 and 108 represent alternate master stations. For purposes of the following discussion, node 102 will be considered to represent the acting master node for nodes 102–108. Communication system 100 also includes a second subsystem represented as a second set of nodes labelled 110, 112 and 114, of which node 110 can be considered a node of master station priority. In accordance with the foregoing discussion, alternate master station 102 transmits a resynchronization message to nodes 104 through 108, in an effort to have nodes 104 through 108 synchronize to acting master station 110, thereby resulting in synchronization of all nodes to true master node 110. In this case, node 102 of alternate master station priority would lose its status as an acting master. That is, the communication system would dynamically reconfigure to optimize communication among the greatest number of nodes within communication range of one another.

In an alternate scenario, where both the node 102 and the node 110 represent alternate master stations, node 102 will again transmit a resynchronization message. If the node 102 locates the node 110, the node 102 will transmit a resynchronization message to nodes 104 through 108 during a contention period in an effort to have nodes 104 through 108 synchronize to node 110.

In accordance with another example, assume that node 102 is of alternate station priority (as opposed to master station priority) and that node 102 has acquired status as an acting master node for all of nodes 102–114. If node 102 subsequently detects the existence of alternate master station 116 during a searching period, node 102 sends a resync message to nodes 104–114 in an effort to have nodes 104–114 resync to node 116. Subsequently, all of nodes 104–114 will attempt to resynchronize to node 116. However, if only node 102 is able to resynchronize to node 116, then the remaining nodes 104–114 will select an acting master node from among them and two networks will be established; i.e., a network including nodes 102 and 116, and a second network including the remaining nodes 104–114 of FIG. 1.

If during a subsequent beacon period of the master node 110, the node 102 detects node 110, then node 102 will take over as acting master node. In this case, node 116 will join node 102 along with nodes 104–114 such that the communication system will have been dynamically reconfigured to optimize the number of nodes in communication with one another. Any time one or more nodes leaves communication range with an acting master node, the system dynamically reconfigures into plural subsystems with separate acting masters.

Of course, numerous scenarios can exist regarding the entry into and departure from a communication system of any number of nodes of varying hierarchal designations. The foregoing examples were merely presented to illustrate exemplary operations of a communication system in accordance with exemplary embodiments of the present invention.

4. Power Management

To further optimize features of a communication system in accordance with exemplary embodiments of the present invention, the transmitters and receivers of one or more nodes within the communication system can be managed to reduce their power consumption. A reduction in power consumption can provide significant advantages, not the least of which is enhanced battery life where one or more of the nodes include battery powered components, such as battery powered transmitters, receivers and/or processors. Exemplary embodiments of a method and apparatus for power management in a communication system will be described in the context of a communication system as set forth above.

In accordance with exemplary embodiments, each node of the communication system includes a transmitter and a receiver. To reduce power consumption in selected nodes, the transmitter of each selected node can be powered on only when actual transmission is occurring. Power management for the receivers of each node is more difficult, since the receivers must be somehow notified when other nodes wish to communicate with them.

In an exemplary embodiment, nodes can be powered on even when no actual reception is occurring to ensure that communications from other nodes within the communication system will be acknowledged and properly handled. However, alternate exemplary embodiments further optimize power management by placing the receiver in each selected node in an inactive state of reduced power consumption until some determination is made within the communication network that another node wishes to send information to that node. That is, the receiver and transmitter of each such node are controlled in accordance with a desired level of operation along a power/performance tradeoff curve. Because the power management for the nodes within the communication system does not rely on any higher-level software for controlling the on/off decision making for the receiver of each node, a power management method and apparatus in accordance with exemplary embodiments is application-independent.

General Operation of Power Management

Figure 10:
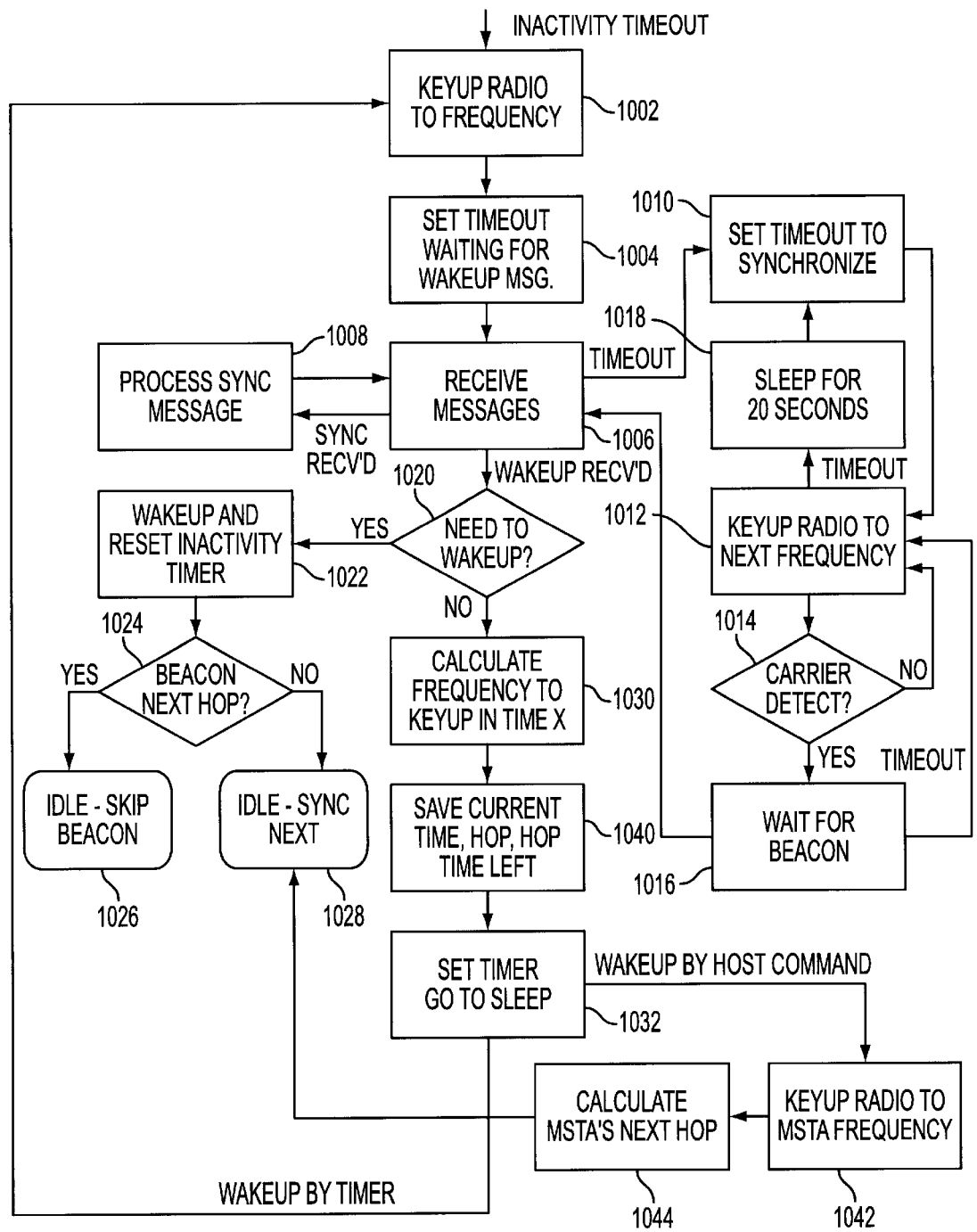
FIGS. 10–11 illustrate an exemplary flowchart of a power management control for a node of a communication system in accordance with an exemplary embodiment of the present invention.

A brief discussion of nodes operating in an inactive, power reduction sleep mode will be provided with respect to the flowchart of FIG. 10. Further, a brief summary of master station operation will be described with respect to the flowchart of FIG. 11.

(i) Node Operation

In an exemplary embodiment, nodes operating in a power saving mode remain synchronized to a master station based on timing information of the master station. For example, the timing information can be a synchronization message which includes the hop period, channel number and current frequency of operation within the channel. Using this information, the node can determine the current hop frequency of the master station at any given time. For example, where a master station switches frequencies in sequential order from a first frequency up to a 79th frequency and back again, and where the master station has a hop period of 400 milliseconds and is currently on frequency 20 of the sequence, the node can calculate that the master will be on frequency 23 in 1.2 seconds.

Because a node can determine the frequency of the master station at any given time, it can calculate where the master station will be in a predetermined period of time leaving some tolerance. This enables the nodes to go into a sleep mode for a predetermined period of time. In accordance with exemplary embodiments, nodes can enter a sleep mode for an exemplary period of one second. If the master station has a hop period of 400 milliseconds, the node can obtain the remaining time of the current hop from the most recent synchronization message of the master station, add 800 milliseconds to skip two hops, and then subtract a predetermined period of time (e.g., 10 milliseconds) to account for some tolerance. The node can then sleep for this period of time. When it wakes up, it can keyup its radio receiver to the calculated frequency in advance of the respective time in which it should receive the next sync message from the master station on that frequency.

While in an inactive state, messages sent to the node can be buffered in the sending node or the master station. The master station, or any node which has transmitted a message to the inactive node, can deduce that the receiving node is in an inactive state based on the failure of the receiving node to respond to the transmitted message. Once the receiving node wakes up, any messages can be obtained from the buffer (e.g., the messages which have been buffered are retransmitted to inactive node).

To wakeup any inactive nodes to whom messages have been sent, the master station (or any other designated node) periodically generates a wakeup signal. The wakeup signal includes an indicator signal for indicating any nodes to which messages have been sent and buffered (as detected, for example, by the failure to receive an acknowledgement from the receiving node). Thus, a receiving node determines, on the basis of a wakeup signal whether to remain in, or exit from, the inactive state.

The foregoing operation is reflected in FIG. 10, wherein after an inactivity timeout, a given node will keyup its receiver to the expected frequency of the synchronization (i.e., sync) message in step 1002. In step 1004, the node sets a timer interval to await receipt of a wakeup message from the master station, and then monitors receipt of such messages in step 1006.

To maintain synchronization, the node processes a synchronization message in step 1008. In the event that a sync message is not received, a sync timeout is set in step 1010. If synchronization does not occur, the node switches to the next frequency of the hop sequence in step 1012 and awaits receipt of the carrier from the master station in step 1014.

Once the carrier is detected and the beacon is received in step 1016, resynchronization can occur by processing the sync message in step 1008. Alternately, if timeout occurs in step 1016 because no beacon was detected, the receiver is keyed to the next frequency in step 1012. If synchronization information is not received within a set time interval, the node returns to a sleep mode in step 1018 for any desired sleep interval (e.g., 20 seconds).

If after synchronizing, the node receives an indication (e.g., an indication signal from the master station, or any other designated node) that a message has been buffered for its receipt, a decision is made in step 1020 that the receiving node should wakeup to receive messages. In accordance with exemplary embodiments, buffering of messages occurs in the sending node, such that the sending nodes (or the master station) retransmit buffered messages at a later time after the receiving (i.e., sleeping) node has been awakened. Thus, any station, including a master station which is attempting to send a message to a sleeping node, can be configured to buffer messages for later transmission to an awakened node. Alternately, a central clearinghouse for buffered messages can, of course, be established to buffer all messages to be transmitted to sleeping nodes.

Once a decision by the receiving node has been made in step 1020 that the node had to wakeup to receive messages, the node enters a normal, active state. For example, the node resets an inactivity timer in step 1022. In step 1024, the node determines whether a beacon has been included in the next hop period. If so, the node remains idle in step 1026 until expiration of that hop period, and then skips the beacon in the next hop period. However, if a beacon is not included in the next hop, then, as represented by step 1028, the node remains idle for the remainder of the hop period, awaiting the sync message in the next hop period.

Returning to decision step 1020, if there is no wakeup information from the master station, the node calculates the frequency at which it will keyup in the next time interval, as represented by step 1030. In step 1040, before the node goes back to sleep in step 1032, a snapshot of timing information is taken by the node which includes any one or more of the current time of the system clock, the current hop frequency which the master station is currently on, and the amount of time left before the master station will move onto the next frequency. By gathering this information in a snapshot, the node can calculate which frequency the master station will be on when the station is awakened to transmit a data packet. In addition, the node can calculate when the master station will hop to the next frequency, and set a timer accordingly in step 1032. At this point, the node returns to an inactive, sleep mode.

If, once in the sleep mode, the node is to transmit information, steps 1042 and 1044 are executed. Unlike step 1022 which is a synchronous event, a wakeup to transmit information is an asynchronous event wherein information acquired in step 1040 is used in steps 1042 and 1044 to synchronize with the master station. Such a feature is used, for example, where the inactive node is used to transmit commands from a host to the wireless communication system. The ability of the node to calculate the frequency of the master station at the time the node awakes to transmit to another node, is reflected in steps 1042 and 1044 of FIG. 10.

More particularly, step 1042 indicates a response of the node to an asynchronous event generated by a host. In this case, the sleeping node can immediately keyup its transceiver to the master station frequency. Further, in step 1044, the node calculates when the master station will hop to the next frequency. On this basis, the node sets a timer, and then transitions to step 1028 wherein the node remains idle until the next hop period wherein it receives the sync message.

As mentioned previously, in step 1040 a sleeping node saves the current time, the current hop frequency which the master is on, and the amount of time left before the master will move to the next frequency. For example, assuming that the master station is currently on hop 24 in its hopping sequence, has a hop period of 200 mS and will hop in 180 mS to the next frequency in its sequence, and that the current system clock time is 10,000 mS, a node is awakened as follows. If the node is awakened by the host at system clock time 10,300 mS, the node can determine that it has been asleep for 300 mS. Further, the node can determine the master station must have passed hop frequency 24 because there was only 180 mS left within the hop period. In addition, the node can determine that the master station is now 120 mS into the hop period of hop frequency 25. Because the hop period is 200 mS in the foregoing example, the node can determine that 80 mS remains in the hop period associated with hop frequency number 25, and can set a timer in step 1044 to switch to hop frequency 26.

The steps 1042 and 1044 described above reflect a situation where the node has been awakened by a host command. However, if no such command is received, the node returns to a sleep state in step 1032 and waits to keyup to the calculated frequency after the sleep period has expired, as represented by the loop from step 1032 back to step 1002.

Thus, a node can quickly synchronize to the master, even after entering an inactive state, to receive a wakeup message. After waking up to receive a subsequent sync message, if the node does not receive a sync message or a wakeup message, the node will try to synchronize to the master station by going through the search procedure described previously with respect to the frequency hopping network of exemplary embodiments set forth herein. After resynchronizing, the node will continue normal operation in a sleep mode. If the node cannot synchronize after scanning a predetermined number of times (e.g., twice the worst case sync time), the node can be configured to extend its sleep time. In accordance with exemplary embodiments described with respect to FIG. 10, the node returns to sleep for one minute, and then attempts to synchronize to the master station again once it wakes up. If it is unable to synchronize, it returns to sleep for another minute.

As discussed with respect to the exemplary FIG. 10 embodiment, a wakeup message is sent by the master station immediately after a sync message. If a node does not detect its address within the wakeup message, it calculates where the master station will be in time X and returns to sleep until that period of time. Conversely, as described with respect to FIG. 10, if the address of the node is included in the wakeup message, it returns from the sleep mode and will not go back to sleep until the inactivity time period expires. Thus, a node can exit the sleep mode whenever its address is contained in the wakeup message or in accordance with alternate embodiments, when it receives a command from the host interface.

(ii) Master Station Operation

Figure 11:
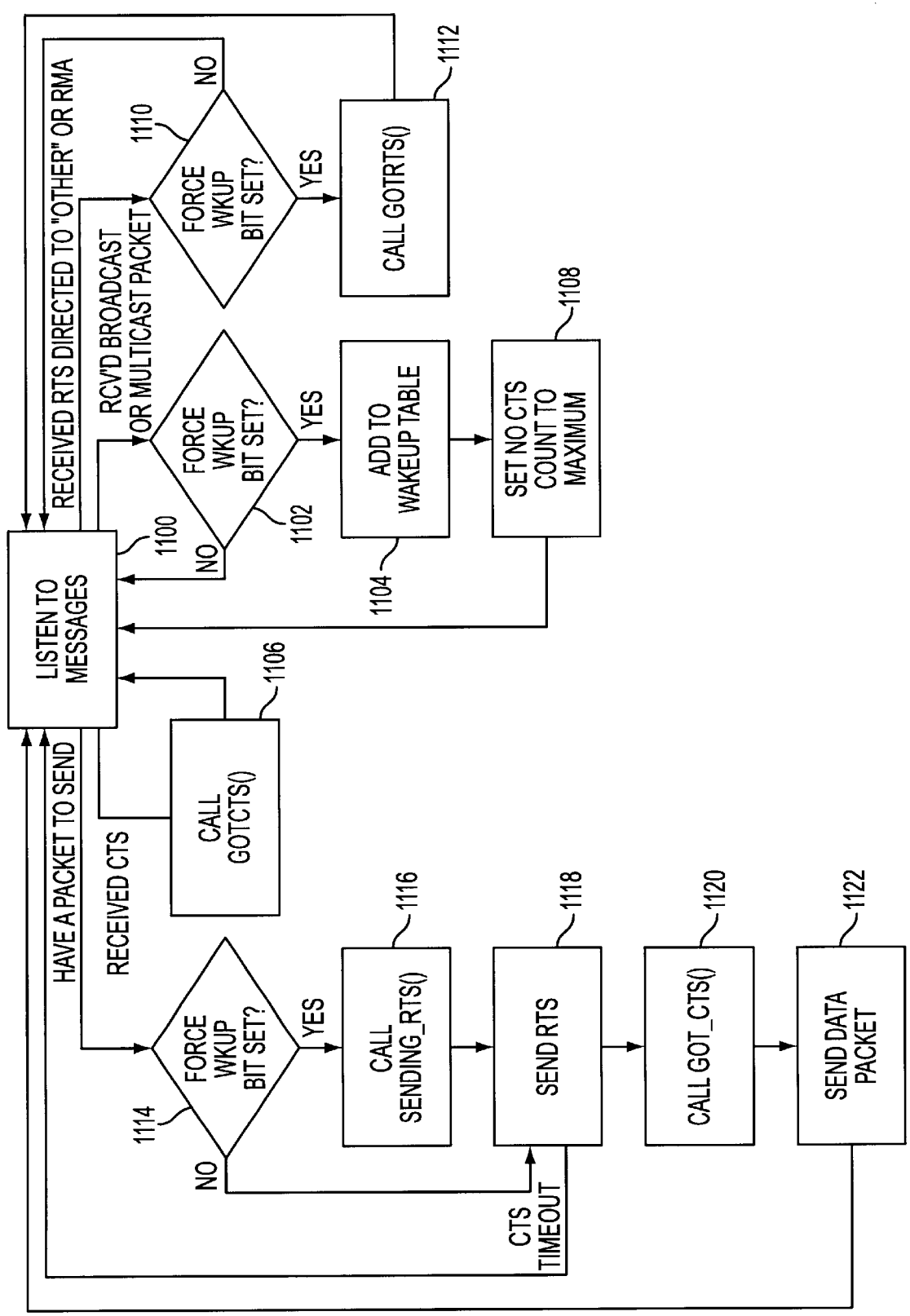

An exemplary flowchart of master station operation is set forth in FIG. 11. As described previously, the master station listens to messages from all nodes in a communication system as represented by step 1100 of FIG. 11. Based on messages received, the master station builds a wakeup list of nodes to whom information has been addressed but which were determined by the master station to be in sleeping modes of operation. The wakeup message includes a list of all nodes which should wakeup because other nodes in the communication system are trying to communicate with them.

To this end, the master station monitors the network to listen for request-to-send packets in step 1100. When it receives a request-to-send packet, it enters the address of the node to which the packet is addressed into the wakeup table.

Typically, a request-to-send signal from a node is followed by a clear-to-send signal from the addressed node. If the master receives the clear-to-send packet in step 1106, it clears this node's address from the wakeup table because the node is already awake and can receive the message from the sending node. However, if the clear-to-send packet is not received, the node's address is retained in the wakeup table. On subsequent receipt of a request-to-send packet to the same node, the master station will increment a counter in the wakeup table.

When the master station sends the wakeup message, it builds the wakeup list by searching the table for node entries which have reached a certain limit such as three. These nodes are considered to be in a sleep mode and are thus included in the wakeup list. Further, aged entries of the wakeup list are removed. In accordance with exemplary embodiments, each time a node address is included in a wakeup message, a counter in the wakeup table is incremented. After a node has been included in the wakeup message for a predetermined number of times, such as 20 times, the entry is deleted.

Depending on the type of network, when the master station receives or transmits a broadcast or multicast packet, the master station also includes the broadcast or multicast address in the wakeup table and in the wakeup list as represented by step 1104. All nodes in the sleep mode are awakened after receiving the wakeup list with the broadcast address in it. Similarly, nodes with the multicast feature activated will wakeup after receiving the wakeup list which includes the multicast address.

For a broadcast or multicast operation, step 1102 represents an evaluation of the addressed nodes to determine whether they are part of a broadcast or multicast operation. If so, each of the nodes which has been configured to participate in a broadcast or multicast operation is added to the wakeup table, and the count associated with each of these nodes is set to a maximum in step 1108. As a result, immediate transmission of the information to all such nodes which participate in the broadcast or multicast operation is provided.

Steps 1110 and 1112 illustrate an operation wherein the forced wakeup of a given node is requested. That is, a request-to-send has been received by a transmitting node which addresses the given node. In this case, the node is added to the wakeup list and buffered information will be transmitted to the addressed node when a predetermined number of request-to-send signals have been received for that node, as described previously.

Note that when a clear-to-send message is received from a node, the master station will also search the wakeup list to see if any other entries exist for that node. If so, all such buffered information is sent to the address node and the nodes address is deleted from the wakeup table.

Steps 1114 through 1122 illustrate a flow of operation wherein the master station actually sends information to a given node. Steps 1114, 1116 and 1118 reflect a situation where no clear-to-send message has been received from an addressed node, such that information to be transmitted to the address node is buffered to the master station. However, in step 1120, a clear-to-send signal is received, such that the master station searches its wakeup list for any entries that may exist for that node. In step 1122, all such information is transmitted to the destination node.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for controlling communication of frequency hopped radio signals among a plurality of nodes in a communication system, comprising the steps of:

initializing the communication system by synchronizing the nodes to a first node;

placing at least one of said plurality of nodes into an inactive state of reduced power consumption at a first time, wherein said at least one node saves timing information of said first node corresponding to said first time; and configuring at least one of said first node and another node in said communication system to determine that said at least one node is in said inactive state by monitoring messages from other nodes in said communication system.

2. Method according to claim 1, further including the step of:

buffering at least one frame of information transmitted by a sending node of the communication system to said at least one node when said at least one node is in said inactive state.

3. Method according to claim 2, wherein said at least one frame of information is buffered by said sending node.

4. Method according to claim 2, wherein said at least one frame of information is buffered by said first node.

5. Method according to claim 2, further including a step of:

retransmitting said buffered frame of information to said at least one node during a predetermined period.

6. Method according to claim 2, further including a step of:

periodically generating a wakeup signal from at least one of said first node and said another node, said wakeup signal including an indicator signal for indicating nodes to which at least one frame of information has been sent and buffered.

7. Method according to claim 1, wherein said at least one node further performs steps of:

periodically scanning the communication system for a synchronization signal from said first node;

updating a matching of synchronization information regarding said first node with synchronization information received from said first node; and receiving a wakeup signal from said first node to determine whether at least one frame of information for said at least one node has been sent and buffered.

8. Method according to claim 1, further including a step of:

sending a synchronization signal from said first node to each of said plurality of nodes, said synchronization signal indicating a hop number of said first node and the hop time remaining in a current hop period.

9. Method according to claim 7, wherein said at least one node further performs the step of:

determining, as a function of said wakeup signal, whether to remain in said inactive state or power up to receive said at least one frame of information.

* * * * *